US010611699B2

(12) United States Patent
Halbleib et al.

(10) Patent No.: US 10,611,699 B2
(45) Date of Patent: Apr. 7, 2020

(54) COMPOSTING DEVICE

(71) Applicant: WHIRLPOOL CORPORATION, Benton Harbor, MI (US)

(72) Inventors: Alexander Joseph Halbleib, Saint Joseph, MI (US); Gregory Samuel Lieto, Grand Haven, MI (US); Matthew MacLean, Saint Joseph, MI (US)

(*) Notice: Subject to any disclaimer, the term of this patent is extended or adjusted under 35 U.S.C. 154(b) by 459 days.

(21) Appl. No.: 15/354,133

(22) Filed: Nov. 17, 2016

(65) Prior Publication Data
US 2017/0174579 A1    Jun. 22, 2017

Related U.S. Application Data

(60) Provisional application No. 62/268,547, filed on Dec. 17, 2015.

(51) Int. Cl.
*C05F 17/02* (2006.01)
*G01B 5/00* (2006.01)
*C05F 17/00* (2020.01)

(52) U.S. Cl.
CPC ...... *C05F 17/0258* (2013.01); *C05F 17/0054* (2013.01); *C05F 17/0063* (2013.01); *C05F 17/0072* (2013.01); *C05F 17/02* (2013.01); *C05F 17/027* (2013.01); *C05F 17/0282* (2013.01); *G01B 5/0021* (2013.01); *Y02P 20/145* (2015.11); *Y02W 30/43* (2015.05)

(58) Field of Classification Search
CPC .............. C05F 17/0258; C05F 17/0054; C05F 17/0063; C05F 17/0072; C05F 17/02; C05F 17/027; C05F 17/0282; C05F 17/0205; G01B 5/0021; Y02W 30/43; Y02P 20/145; Y10S 241/38; B02C 18/12; E03C 1/2665; B01F 7/00725; B01F 7/00733; B01F 7/06; B01F 13/1013; B01F 7/00975; B01F 2215/0431; B01F 2215/0481; C12M 21/04; C12M 23/46; C12M 27/02; Y02E 50/343
See application file for complete search history.

(56) References Cited

U.S. PATENT DOCUMENTS

| | | | | |
|---|---|---|---|---|
| 3,024,010 A * | 3/1962 | Sperling | .................. | B01F 7/162 366/314 |
| 4,343,051 A * | 8/1982 | Persson | .................. | A47K 11/02 4/111.1 |
| 5,090,815 A * | 2/1992 | Bohle | .................. | B01F 7/00275 222/504 |
| 5,297,741 A * | 3/1994 | Zurn | ....................... | B02C 13/04 241/19 |
| 6,955,461 B2 * | 10/2005 | Kar | ....................... | B01F 3/1221 366/196 |

(Continued)

*Primary Examiner* — William H. Beisner
*Assistant Examiner* — Danielle B Henkel
(74) *Attorney, Agent, or Firm* — McGarry Bair PC

(57) ABSTRACT

A method of determining the volume of organic material in a composting device includes rotating a mixing paddle in a composting bin that stores the organic material; monitoring the torque from a motor that rotates the mixing paddle as the mixing paddle rotates; and determining the height of the organic material in the composting bin based on the motor torque and the angular displacement of the mixing paddle. The resulting height can be used to determine the volume of the organic material.

20 Claims, 15 Drawing Sheets

(56) References Cited

U.S. PATENT DOCUMENTS

| | | | |
|---|---|---|---|
| 8,770,941 B2 * | 7/2014 | Smith | B63H 1/26 |
| | | | 416/204 R |
| 2007/0218541 A1 * | 9/2007 | Denney | C02F 1/008 |
| | | | 435/267 |
| 2011/0261643 A1 * | 10/2011 | Handa | B01F 7/00133 |
| | | | 366/270 |
| 2012/0252107 A1 | 10/2012 | Self | |
| 2013/0217111 A1 | 8/2013 | Chang | |
| 2017/0260108 A1 | 9/2017 | Koh | |
| 2017/0333853 A1 * | 11/2017 | Czwaluk | B01F 7/00725 |

* cited by examiner

COMPOSTING DEVICE

CROSS-REFERENCE TO RELATED APPLICATIONS

This application claims the benefit of U.S. Provisional Patent Application No. 62/268,547, filed Dec. 17, 2015, which is incorporated by reference in its entirety.

BACKGROUND

Composting devices are known to implement a composting cycle for biologically and chemically decomposing organic material, such as food waste, into compost for use as a fertilizer and soil amendment. The composting cycle can be implemented in a composting bin by providing water, heat and aeration to the refuse, and can require a period of time for completion. Composting devices usually require a large floor space or a large volume for installation. Further, some composting devices can be a batch type device, therefore cannot be effective in producing compost in a continuous way.

To determine the fill level of a composting bin, multiple load cells detect the weight of the organic material and the weight provides an estimate of volume. Variance in the density of the refuse material can compromise the accuracy of the weight-to-volume conversion. To avoid weight drift that can further compromise the volume estimation, load cells require regular calibration to be tared.

BRIEF SUMMARY

In one aspect, a method of determining an amount of organic material in a composting device having a composting bin with a reducing mechanism, the method comprising operating a motor to rotate the reducing mechanism in the composting bin, monitoring a signal representative of a torque of the motor as it rotates the reducing mechanism, comparing the signal to an angular displacement of the reducing mechanism, and determining the amount of organic material in the composting bin based on the motor torque and the angular displacement of the reducing mechanism.

In another aspect a composter comprising a housing, a controller, a composter bin defining a chamber configured to receive organic material, a reducing mechanism, and a motor providing a necessary torque to the reducing mechanism for rotating through the organic material, wherein an amount of the organic material in the composting bin is determined based on the necessary torque provided.

DETAILED DESCRIPTION

Figure 1:
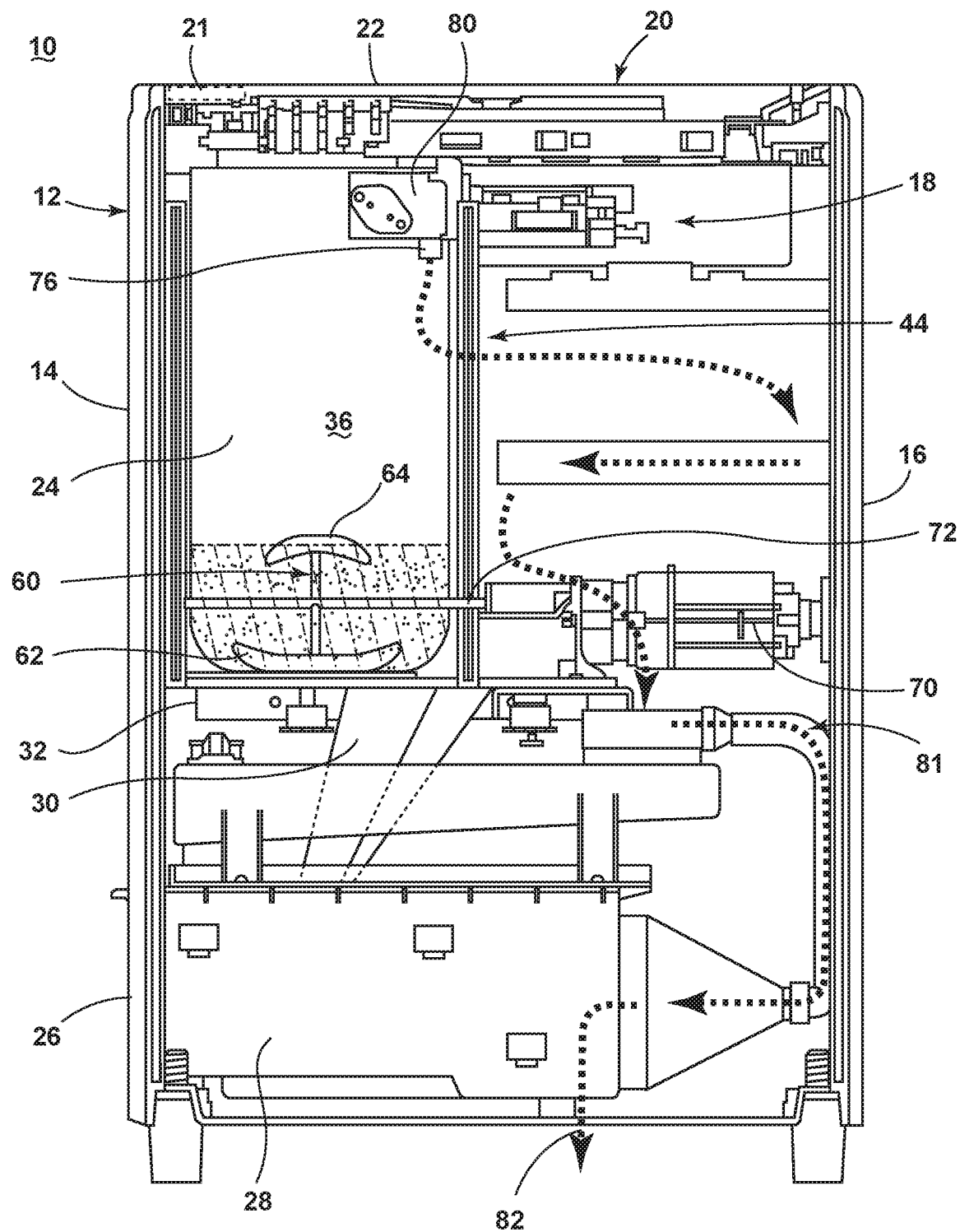
FIG. 1 is an example schematic cross-sectional illustration of a composting device.

FIG. 1 shows a side view of a composting device 10 for transforming organic material into compost. The composting device 10 can include a housing 12 having a front wall 14 spaced from a back wall 16, and a pair of side walls. A top wall 20 can enclose the housing 12 at the top of the front wall 14, back wall 16, and the pair of side walls. The housing 12 can be any structure for enclosing, supporting and protecting the electrical and mechanical components of the composting device 10 including, but not limited to a cabinet and a frame.

The top wall 20 can include a cover 22 pivotally mounted to a portion of the top wall 20 for movement between open or closed positions to enable access to interior components of the composting device 10. The cover 22 can be any barrier that provides selective access for inputting organic material into the composting device 10, including, but not limited to a hingedly, slidably or removably mounted door, drawer, panel or lid. While shown in FIG. 1 as coupled to the top wall 20, the cover 22 can be mounted to any exterior wall enclosing the housing 12 including, but not limited to the front wall 14. The top wall 20, as well as the remainder of the housing 12, can be formed of any material suitable for construction of the housing structure including, but not limited to metal such as steel or steel alloy, plastic, composite materials such as a hardened polymer composite material and combinations thereof. Some models of composting devices 10 can include decorative panels that can be mounted on the housing 12 or one or more walls.

A controller 18 can be located within the composting device 10 and can be operably coupled with a user interface 21 for receiving user-selected inputs and communicating information to a user. The user interface 21 can be provided on a portion of the top wall 20 for communicating with the user. The user interface 21 can include operational controls such as dials, lights, switches, and displays enabling the user to input commands to the controller 18 and receive information about a cycle of operation.

When in the open position, the cover 22 can expose a top portion of the composter bin 24 positioned beneath the cover 22 in the closed position. Besides the provision of access to the composter bin 24, the cover 22, in an open position, can expose any element of the composting device 10 interior of the housing 12 including but not limited to one or more water fill inlets for supplying water to the composting device 10 and one or more enzyme dispenser inlets.

The front wall 14 can include an access drawer 26, which can be movably connected to the housing 12 to provide access to the interior. As illustrated, the access drawer 26 is a drawer slidably mounted to the housing 12 on a horizontal axis for movement between open and closed positions. It will be understood, however, that access to the interior of the composting device 10 via the front wall 14 can be provided in other ways, including but not limited to, a door pivotally connected to the front wall 14.

A container 28 can be detachably mounted to an internal side of the access drawer 26 where it is accessible from outside the housing 12 when the access drawer 26 is in an open position. However, depending upon the implementation, the container 28 can be positioned in the interior of the housing 12 without explicitly being mounted to the access drawer 26. The container 28 can be removable from the interior of the housing 12 so that the contents thereof can be discharged at will by a user, as for example, by dumping the contents of the container 28 onto a garden.

The composter bin 24 can be fixedly or removable mounted to the housing 12. The composter bin 24 can define a chamber 36 configured to receive organic material from outside of the composting device 10, either directly or indirectly.

A conduit 30 can extend from the composter bin 24 preferably from a lower portion of the composter bin 24 toward the front of the housing 12 and the container 28. A transfer mechanism (not shown) disposed inside the conduit 30 can be any mechanism capable of assisting the transfer of material from the composter bin 24 to the container 28 including, but not limited to a rotatable auger, a conveyor, a gravitational chute, etc.

A first heating element 32 can be coupled to the exterior of the composter bin 24 for controllably providing heat energy to the material received in the interior of the composter bin 24. The first heating element 32 can be any type of heating element capable of generating and directing heat to the interior of the composter bin 24 including, but not limited to, a stick-on heater, a blanket heater, and a sheath heater.

A first reducing mechanism 60 can be provided adjacent or within the composter bin 24. The first reducing mechanism 60 can be in the form of a mixer, a grinding wheel, a grinding blade, any chopping mechanism, or any like device or combination thereof that grinds, shears chops, mixes, breaks, or otherwise reduces the particle sizes of refuse by the operation of the first reducing mechanism 60 and/or uniformly mixing refuse with water, air or enzymes that can be introduced in the composter bin 24 for transforming the refuse into compost.

As a mixer, the first reducing mechanism 60 can include first and second paddles 62, 64 having different dimensions and shapes, respectively, while other configurations can be also possible for the first reducing mechanism 60. As illustrated, the first paddle 62 can be horizontally extended and then angled in a vertical direction. The second paddle 64 can be in a curved shape similar or dissimilar to that of the first paddle 62 for uniformly mixing the refuse received in the interior of the composter bin 24, in combination of the first paddle 62. As described below in further detail, in one exemplary implementation, the first and the second paddles 62, 64 should not be identical in both shape and size.

The container 28 can also include a second reducing mechanism (not shown) positioned at a lower portion of the container 28. The second reducing mechanism 66 in the container 28 can include at least one blade or paddle or any other element suitable for further reducing the dimension of materials and uniform mixing of materials in the container 28.

A motor 70 can be provided inside the housing 12 behind the composter bin 24 and can be operably coupled to the first reducing mechanism 60 via a rotatable shaft 72. The motor 70 can be a brushless permanent magnet (BPM) motor. Alternately, other motors such as an induction motor or a permanent split capacitor (PSC) motor can also be used. The motor 70 can be configured to operate the first reducing mechanism 60 at different speeds during the cycle of operation to facilitate the reducing and/or mixing of refuse in the interior of the composter bin 24 and/or the container 28.

An air supply system can be provided to the composting device 10 for providing air flow into and out of the composter bin 24 or the container 28. The air supply system can include a fan compartment 80 for supplying, drawing, and filtering air into and out of the composter bin 24, and the fan compartment 80 can include a vacuum pump, a fan, and filter material. The fan in the fan compartment 80 can be fluidly coupled to the composter bin 24 via an air inlet tube 76 for supplying the air into the composter bin 24. The air supply system can include a pre-filter (not shown) to filter any unwanted dust from the air inlet.

The fan compartment 80 can be fluidly coupled to an outlet 44 of the composter bin 24. For example, the vacuum pump of the fan compartment 80 can be positioned adjacent to the outlet 44 for controllably drawing air with odors and/or microbes from the composter bin 24 by operating the vacuum pump. Filter material, such as charcoal, positioned in the fan compartment 80 can filter odors and/or microbes from the air drawn from the composter bin 24. It will be understood that the fan can also be fluidly coupled to the container 28 via an air supply inlet 81 for supplying filtered air downwardly into the container 28.

An air outlet tube 82 can fluidly extend from a portion of the container 28 for drawing the air from the container 28 to eliminate odors and/or microbes generated in the container 28 before the air is exhausted out of the composting device 10. The air outlet tube 82 can be coupled to an air filter, which can include filter material. Filter material can include any material suitable for filtering the air including, but not limited to, charcoal, previously composted material and/or a biofilter material. While not shown, the operation of the air filter can be controlled by the fan compartment 80.

The composting device 10 can include one or more sensors 100 provided in one or more of the components of the composting device 10 to receive input from the sensors, which are known in the art and not shown for simplicity. Non-limiting examples of sensors 100 include: temperature sensors, humidity sensors (or moisture sensors), level sensors, odor sensors, pH sensors, water level sensor, temperature sensor, and weight sensors. For example, a humidity sensor can be provided to the interior of the composter bin 24 and the container 28 respectively for determining the amount of humidity in the composter bin 24 and the container 28. In another example, a level sensor can be provided to at least one of the composter bin 24 or the container 28 to determine the amount of refuse or material in the composter bin 24 or the container 28. A temperature sensor can be operably coupled to the interior of the composter bin 24 for determining the temperature of refuse.

Figure 2:
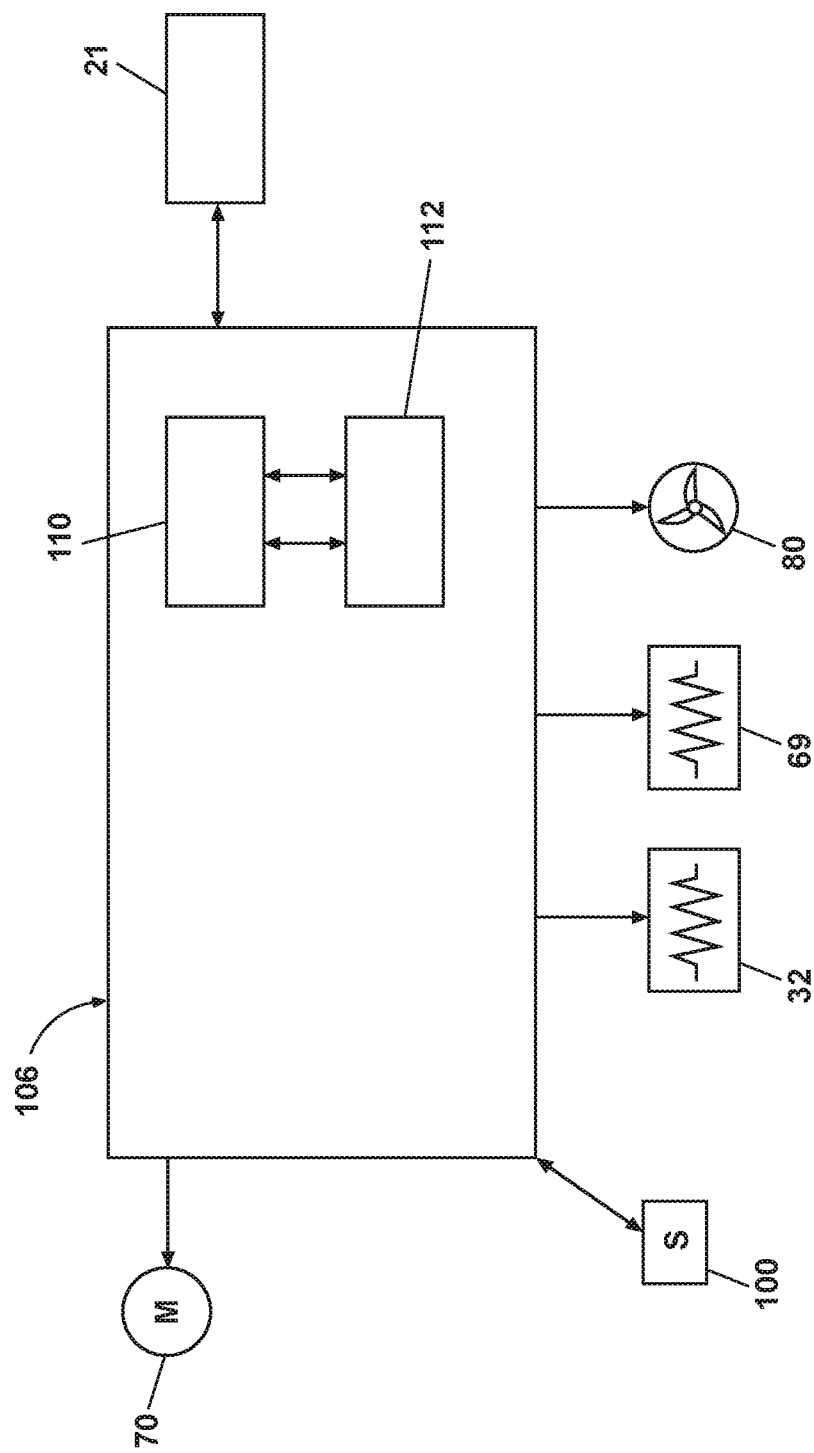
FIG. 2 is a block diagram of a control system of the composting device of FIG. 1.

Referring now to FIG. 2, a schematic of the controller 106 for controlling the operation of the composting device 10 is illustrated. The controller 106 can be provided with a memory 110 and a central processing unit (CPU) 112. The memory 110 can be used for storing the control software that is executed by the CPU 112 in completing a cycle of operation using the composting device 10 and any additional software. The memory 110 can also be used to store information, such as a database or table, and to store data received from one or more components of the composting device 10 that can be communicably coupled with the controller 106.

The controller 106 can be operably coupled with one or more components of the compositing device 10 for communicating with and controlling the operation of the component to complete a cycle of operation. For example, the controller 106 can be operably coupled with the motor 70 to control the operation of the motor 70. In another example, the controller 106 can be operably coupled to the fan compartment 80 for selectively operating the vacuum pump and fan received in the fan compartment 80.

The controller 106 can be operably coupled with the heating elements 32, 69 for controllably providing heat energy to the heating elements 32, 69 according to a cycle of operation, for keeping the temperature and/or humidity in the composter bin 24 and container 28 within a predetermined range.

The controller 106 can also be coupled with one or more sensors 100 provided in one or more of the systems of the composting device 10 to receive input from the sensors, which are known in the art and not shown for simplicity. Non-limiting examples of sensors 100 that can be communicably coupled with the controller 106 include: temperature sensor, humidity sensor, level sensor, odor sensor, pH sensor, water level sensor, temperature sensor, and weight sensor, which can be used to determine a variety of system characteristics, such as the amount of moisture in the refuse, the amount or temperature of the refuse in the composter bin 24, etc.

In operation, refuse, such as organic food waste or leaves, can be provided by the user to the interior of the composter bin 24 through when the cover 22 is in an open position. The refuse can be supplied to the interior of the composter bin 24 over a period of time until the volume or weight of the refuse satisfies a predetermined threshold, as determined by the level sensor or weight sensor. The composting cycle can begin when the level of refuse reaches a predetermined level or it can begin as soon as refuse is placed in the composter bin 24. In another embodiment, the composting cycle can initiate as long as the level sensor or weight sensor determines that the refuse is received in the composter bin 24.

The refuse can be uniformly mixed and decimated by rotating the reducing mechanism positioned at the lower portion of the composter bin 24 at a predetermined speed according to the cycle of operation. Grinding can occur periodically. The refuse can also be provided with heat, water and/or aeration according to the cycle of operation to promote the decomposition of the refuse. During the composting process, worms, bacteria and fungi can further break up the refuse in a chemical process that converts the refuse into heat, carbon dioxide or ammonium, which can be beneficial as a fertilizer to the soil. The humidity level in the composter bin 24 can be monitored by the humidity sensor such that the humidity cannot decline below a predetermined level. In one example, the relative humidity in the interior of the composter bin 24 and the container 28 is controlled such that it does not go below about 25% to prevent the refuse from being too dry.

During the composting process, first heating element 32 can be controllably operated to maintain the temperature in the composter bin 24 within a predetermined temperature range. The predetermined temperature range can vary with the progress of composting process, and the temperature can be determined by the temperature sensor. By keeping the temperature within a predetermined range, the number of microbes undesirable to the composting process can be reduced. Further, the relative humidity level in the composter bin 24 can also be controlled by controllably operating the first heating element 32 to enhance the overall rate of composting process. For example, the controlled operation of heating element 32 can be advantageous in reducing excessive humidity from wet organic food waste.

While the composting process proceeds in the composter bin 24, partially composted refuse is transferred from the composter bin 24 to the container 28. Enzymes can be provided to the composter bin 24 or the container 28 or both by an enzyme dispenser for continuing and enhancing the composting process. The refuse can be further decomposed by controlling the amount of water and aeration in the refuse in the container 28.

Figure 3:
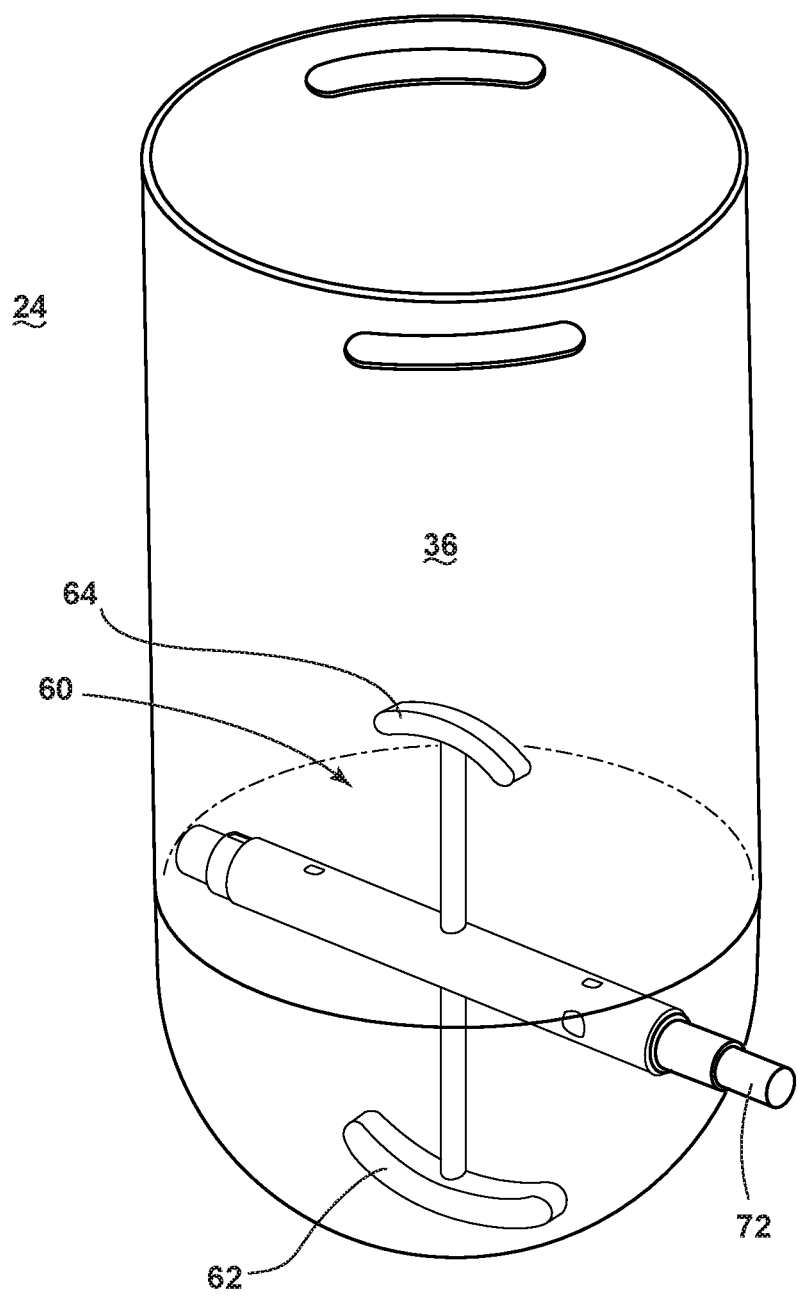
FIG. 3 is a perspective illustration of a composting bin that can be utilized in the composting device of FIG. 1.

Referring now to FIG. 3, a perspective illustration of a composting bin 24 is shown. As described above, the composting bin 24 defines a chamber 36 for storing and composting organic material. In one exemplary embodiment, the composting bin 24 is capsular in that the composting bin 24 is formed as an upright cylinder with a hemispherical lower portion. The mixing paddles 62, 64 are curved to match the contour of the hemispherical lower portion. A cycle of operation can include mixing the organic material with the mixing paddles 62, 64 of the reducing mechanism 60.

Figure 4:
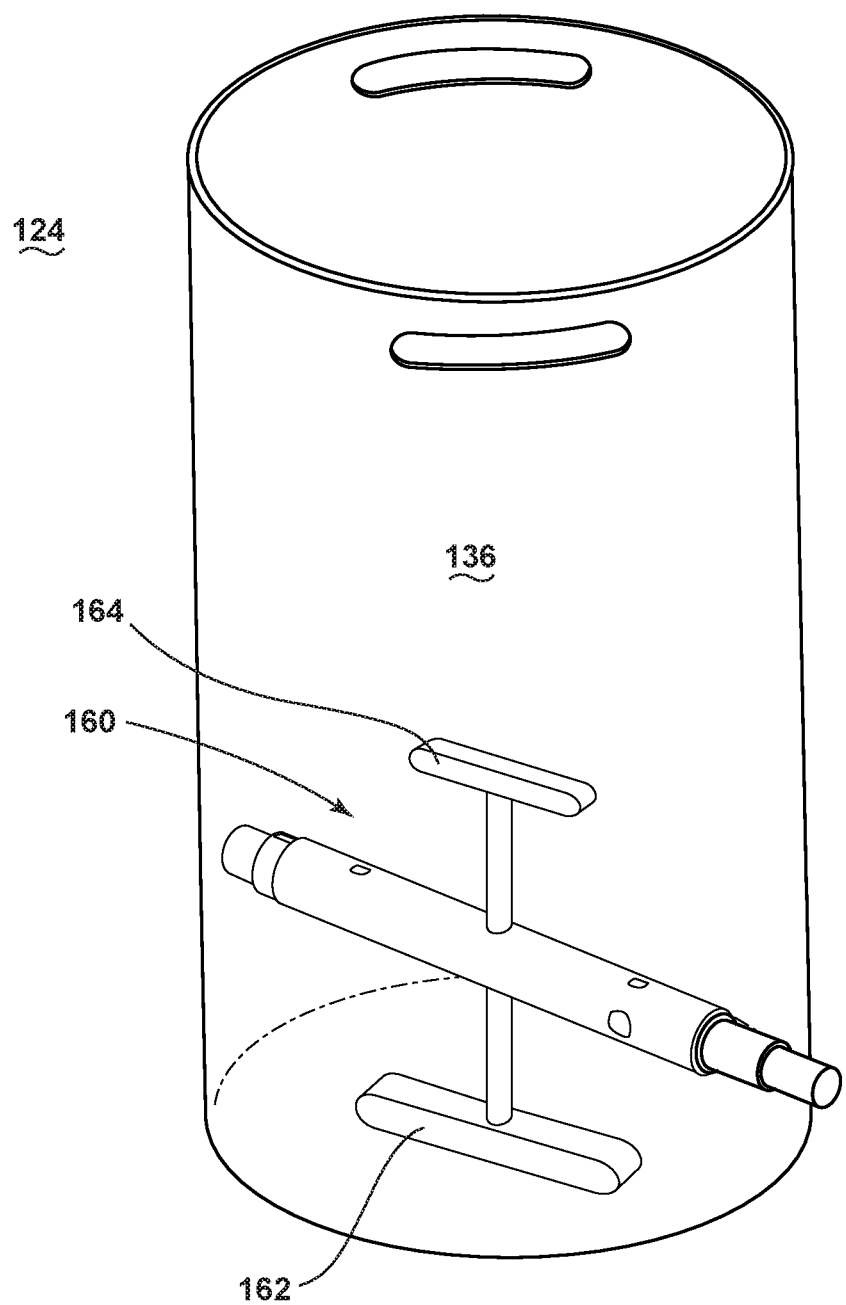
FIG. 4 is a perspective illustration of another composting bin that can be utilized in the composting device of FIG. 1.

FIG. 4 illustrates an alternative composting bin 124. The composting bin 124 is similar to that illustrated in FIG. 3; therefore, like parts will be identified with like numerals increased by 100, with it being understood that the description of the like parts of the first composting bin applies to the second composting bin, unless otherwise noted. The figures of the alternative composting bin 124 are intended to illustrate one non-limiting example of the composting bin, as described, and do not specifically represent any necessary feature or shape of the composting bin or its assembly into a composting device. The composting bin 124 is formed as a cylinder with a flat, lower portion. Mixing paddles 162, 164 include a flat bar each of which extend to the bottom lower portion when at their nadir during rotation during a cycle of operation.

Figure 5:
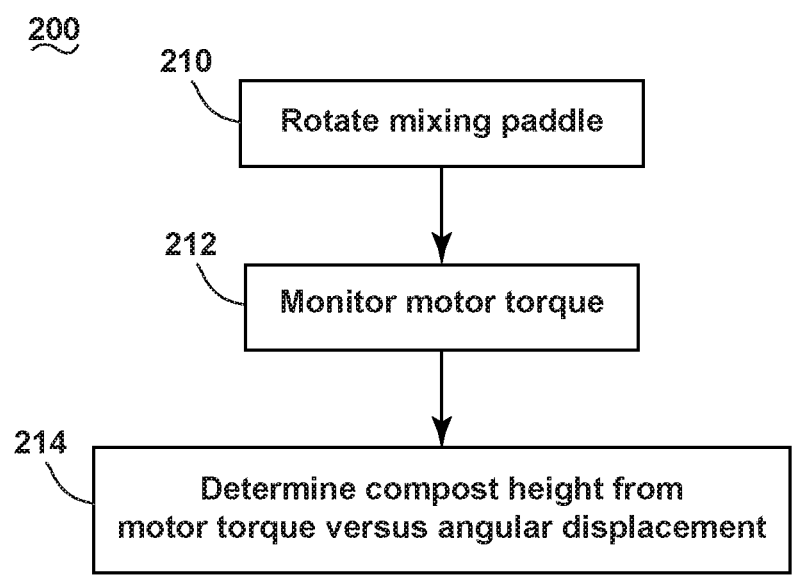
FIG. 5 is a flowchart illustrating a method of determining the height of organic material in a composting bin.

During a cycle of operation, the motor applies a torque to the reducing mechanism 60 (e.g. the mixer) to rotate the mixing paddles 62, 64 through the organic material. The magnitude of the torque necessary to rotate the mixing paddles 62, 64 through the organic material depends in part on the amount of organic material present in the composting bin 24. Therefore, a method to determine the amount of organic material in the composting bin 24 can include monitoring and analyzing the motor torque. Referring now to FIG. 5, a method 200 of determining the height of organic material in a composting bin 24 is shown.

The method 200 of determining the height of organic material in a composting bin includes a first step 210 of rotating the mixing paddles 62, 64 of the reducing mechanism 60. During the rotating of the mixing paddles, the controller 106 can monitor a signal representative of the motor torque at step 212. The signal can be any suitable signal that is a function of the moment of force used to rotate the mixing paddles 62, 64, including but not limited to digital or analog measurements of motor duty cycle, motor current, motor voltage, back-electromotive force, motor current-voltage phase relationship and combinations thereof.

At step 214, the controller can determine the height of the organic material in the composting bin 24 by comparing the motor torque signal versus the angular displacement of the mixing paddles 62, 64. In other words, as the mixing paddles 62, 64 rotate through the composting bin 24, the amount of torque required to rotate the mixing paddles 62, 64 as a function of the angular position of the mixing paddles 62, 64 is proportional to height of the organic material in the composting bin 24. When a mixing paddle 62, 64 travels through the organic material, the motor torque is higher than when the mixing paddle 62, 64 travels through air. Additionally, because the mixing paddles 62, 64 are of different shape or size the amount of torque needed to move the mixing paddles 62, 64 through the organic material is different for each paddle.

The signal representative of motor torque as a function of the angular displacement of the mixing paddles 62, 64 forms a signature that is a time history representation of the motor torque as the mixing paddles rotate through some amount of organic material. By analysis of the signature, the controller 106 can determine the height of the organic material in the composting bin 24 and, subsequently, convert that height estimate into a volume estimate. Any algorithmic technique suitable for selecting a signature from a spectrum of signatures can be implemented, including but not limited to regression analysis, matching pursuits, wavelet or spline decompositions, neural nets, least squares fitting, parameter estimation, etc.

Figure 6:
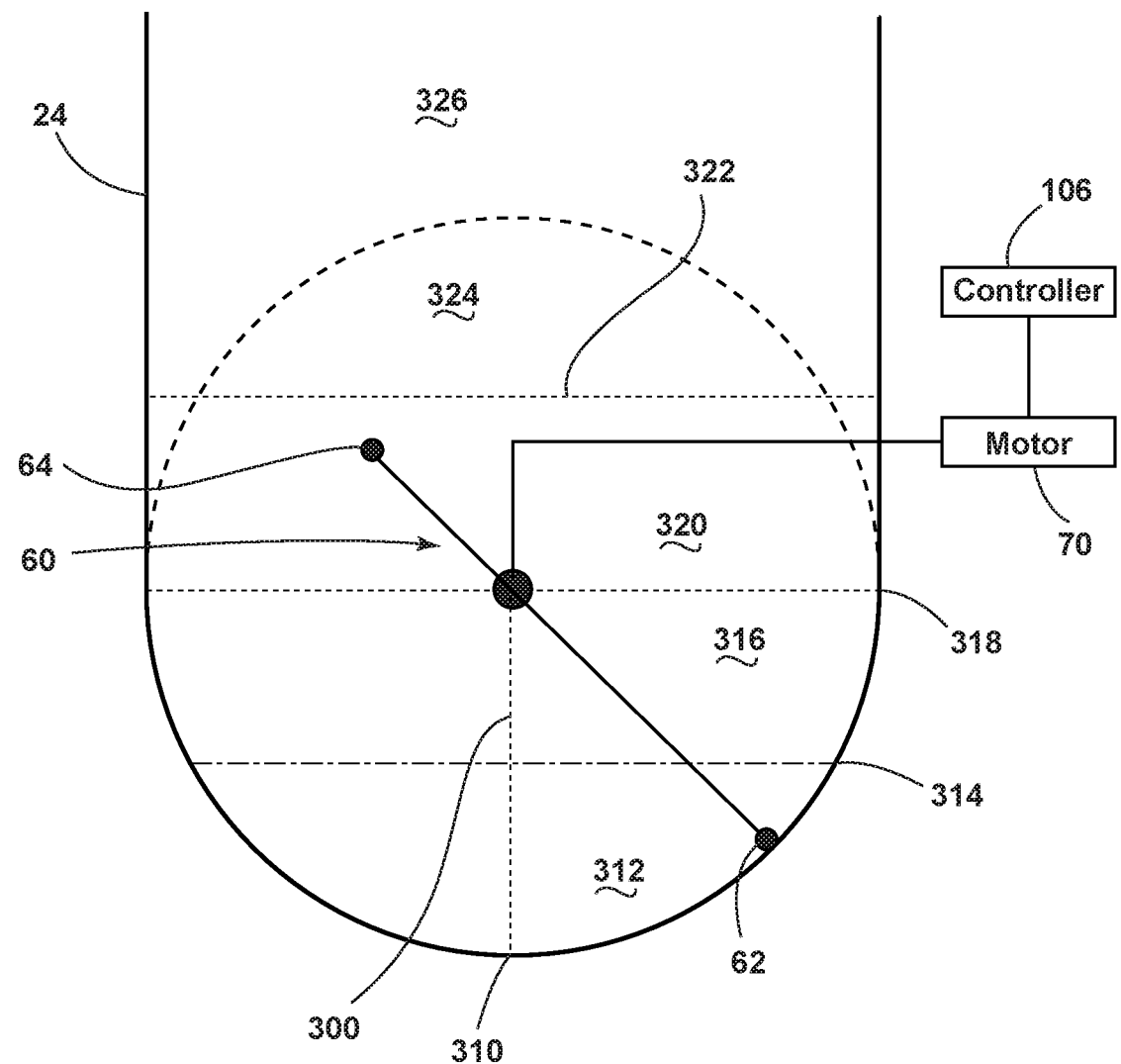
FIG. 6 is a cross-sectional illustration of a composting bin with a mixing paddle connected to a motor and controller.

Referring now to FIG. 6, a schematic representation of a schematic illustration of a composting bin 24 with rotatable mixing paddles 62, 64 connected to a motor 70 and controller 106 is shown. The mixing paddles 62, 64 are shown at different lengths extending radially from the central axis of the reducing mechanism 60. The differing lengths of the mixing paddles 62, 64 enable more variation in the resulting torque versus angular displacement signatures used to estimate the compost height. Boundaries 310, 314, 318, 322, in dotted line, define different height zones 312, 316, 320, which represent different volumes within the composting bin 24. The height of the organic material determines the volume representative of a particular zone.

Each zone has a unique signature representative of organic material height. The first boundary 310 is where no organic material is located within the composting bin 24. The mixing paddles 62, 64 rotate unfettered through the composting bin 24 incurring a minimal motor torque.

The first zone 312 is where organic material is present at a height less than the extent of the shorter mixing paddle 64. Therefore, the longer mixing paddle 62 rotates through composting material and the shorter mixing paddles 64 does not. When the longer mixing paddle 62 rotates through the composting material, the motor 70 incurs a larger torque. The shorter mixing paddle 64 does not rotate through the organic material and therefore the motor does not incur additional torque from the shorter mixing paddle 64. When the organic material is at a height of the second boundary 314, the shorter mixing paddle 64 grazes the organic material.

The second zone 316 is where organic material is present at a height less than the rotational axis of the mixing paddles 62, 64. Therefore, the longer mixing paddle 62 and the shorter mixing paddle 64 rotate through the composting material for part of each rotation of the reducing mechanism 60. When each mixing paddle 62, 64 rotate through the composting material, the motor 70 incurs a torque. Due to the size or shape difference of the mixing paddles, when the larger mixing paddle 62 passes through the organic material, the motor incurs a larger torque than when the smaller mixing paddle 64 passes through the organic material. When the organic material is at a height of the third boundary 318, the organic material is at the height of the rotational axis of the mixing paddles 62, 64. Consequently, the motor incurs a larger torque value for the 180 of the 360 degrees of rotation where the larger mixing paddle 62 passes through the organic material.

The third zone 320 is where organic material is present at a height more than the rotational axis of the mixing paddles 62, 64. Therefore, the longer mixing paddle 62 and the shorter mixing paddle 64 rotate through the composting material for more than half of each rotation of the reducing mechanism 60. When both mixing paddles 62, 64 rotate through the composting material at the same time, the motor 70 incurs an additively increased torque. When the organic material is at a height of the fourth boundary 322, the organic material is at the height of the shorter mixing paddle 64 vertically extended above it axis of rotation. Consequently, the motor incurs a torque value for 360 degrees of rotation for the shorter paddle 64 which is additive to the torque incurred by the larger paddle 62 when it passes through the organic material. The fourth zone 324 includes all the heights of the organic material at which the smaller paddle 64 passes through the organic material for 360 degrees of rotation and the larger paddle 62 passes through the organic material for the majority, but not all of, a rotation.

The fifth zone 326 encompasses the heights of the organic material that meet or exceed the length of the larger paddle 62 positioned vertically above the axis of rotation of the reducing mechanism 60. The motor 70 incurs a torque resulting from both mixing paddles 62, 64 for 360 degrees of rotation.

Figure 7:
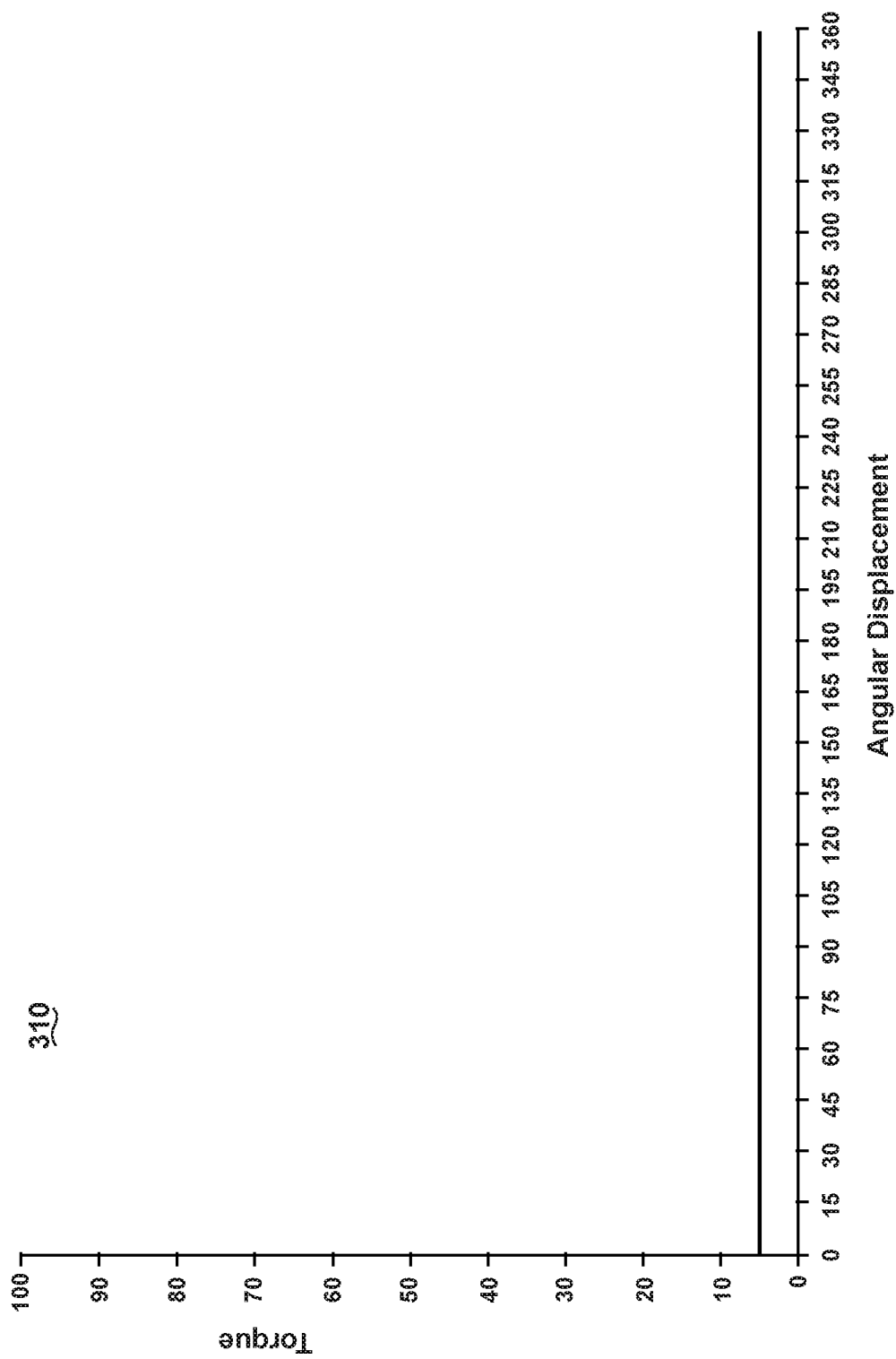
FIGS. 7-15 are graphs illustrating motor torque versus mixing paddle angular displacement for various levels of organic material in a composting bin.
Figure 8:
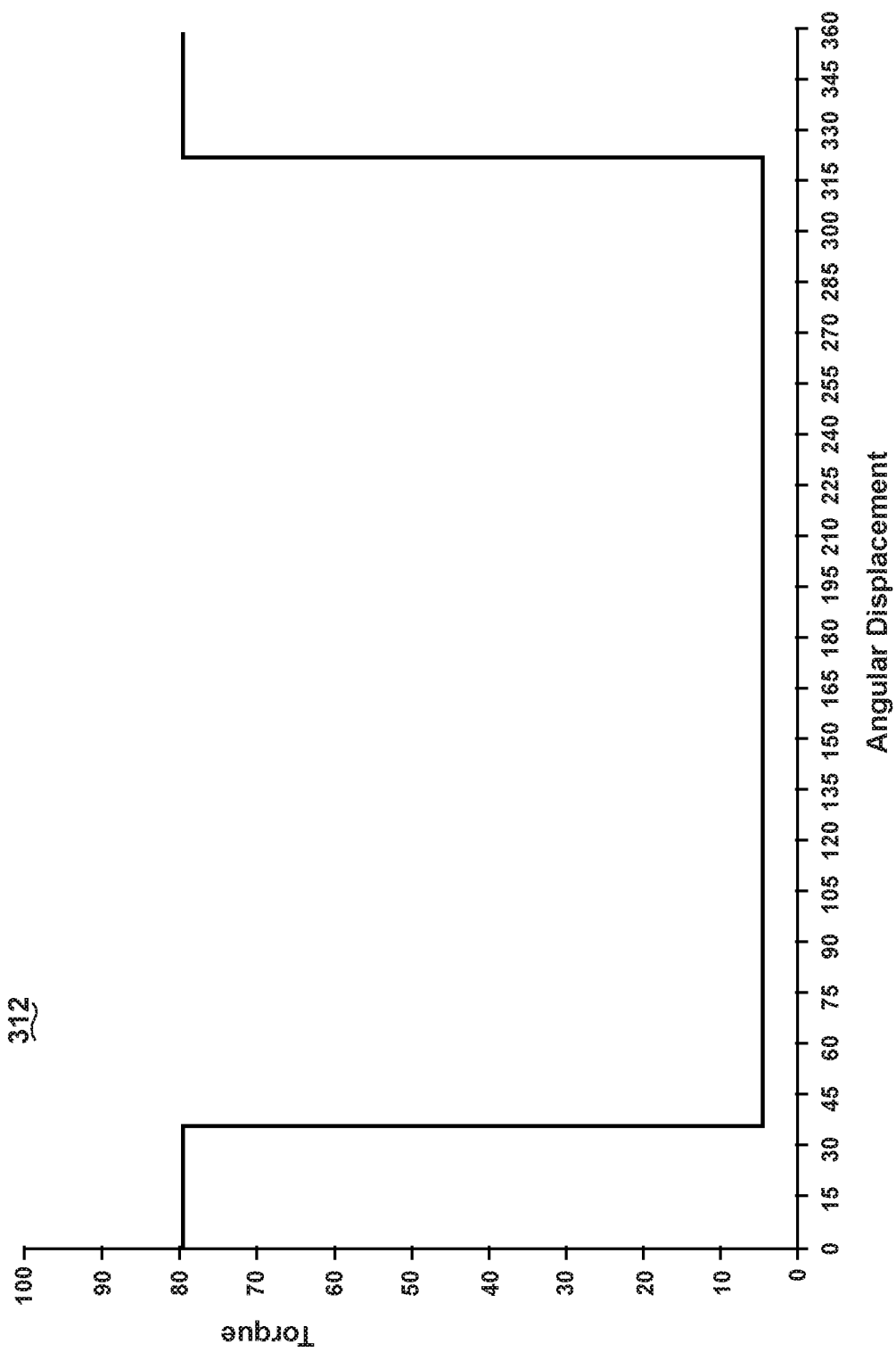
Figure 9:
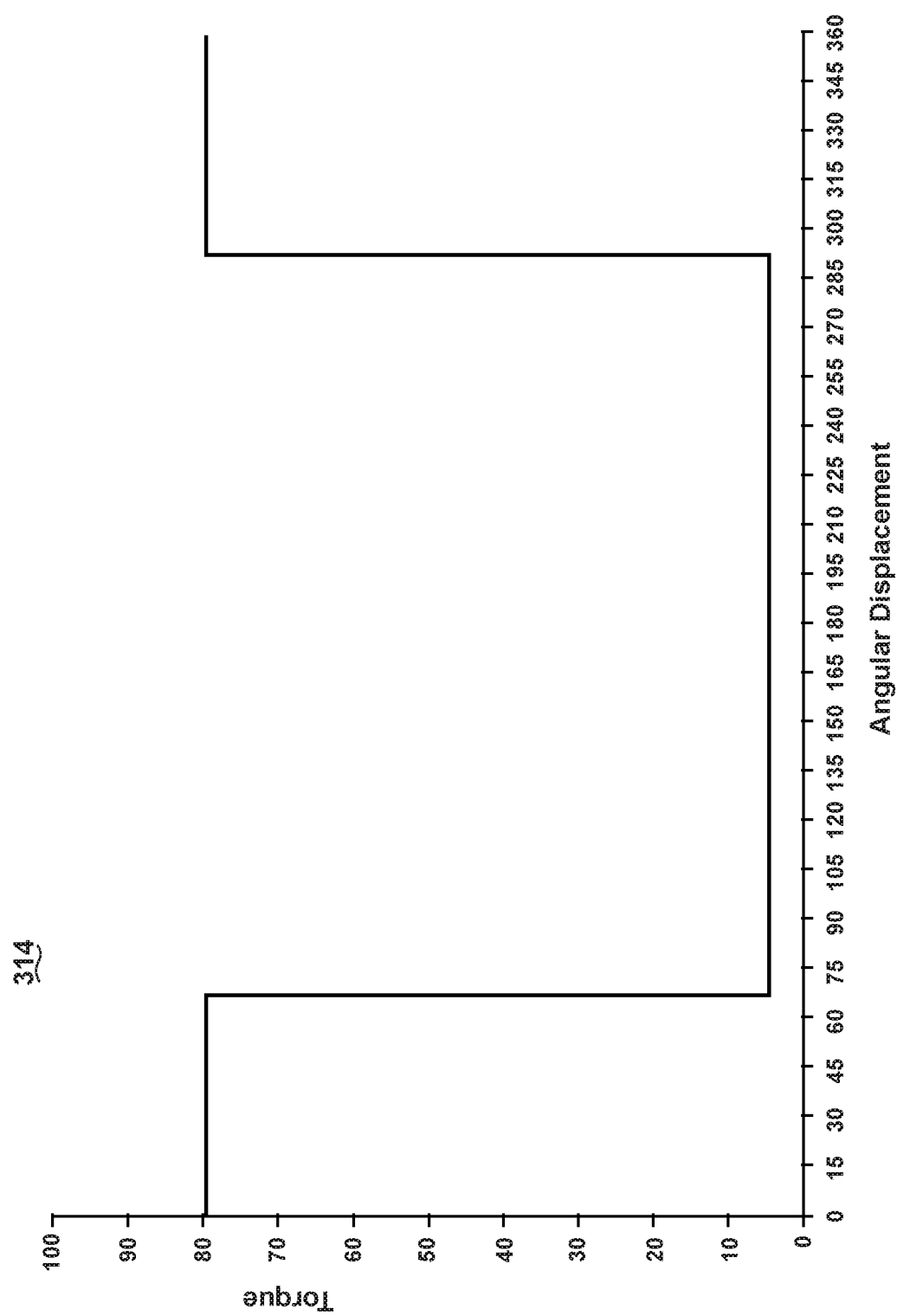
Figure 10:
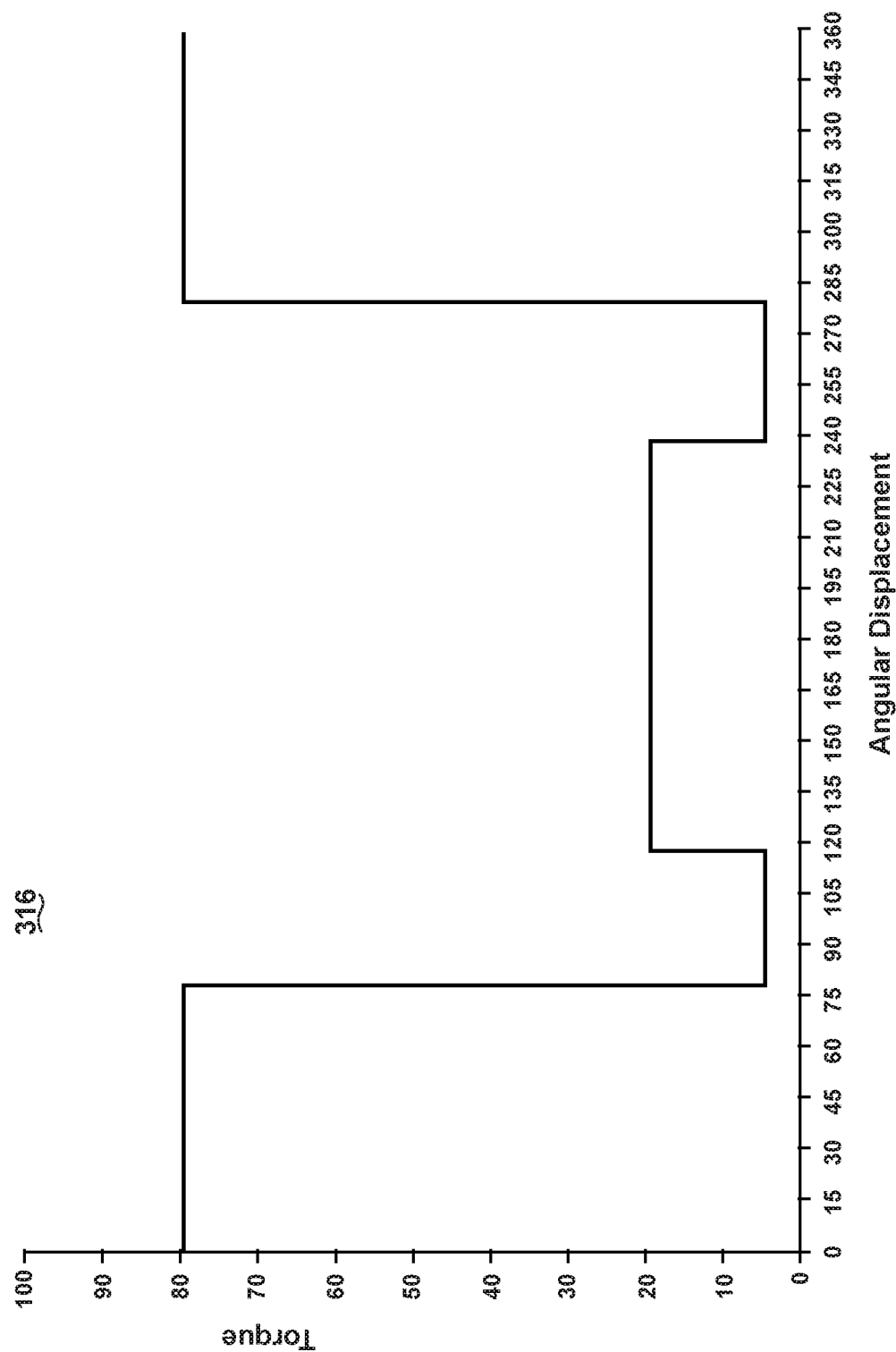
Figure 11:
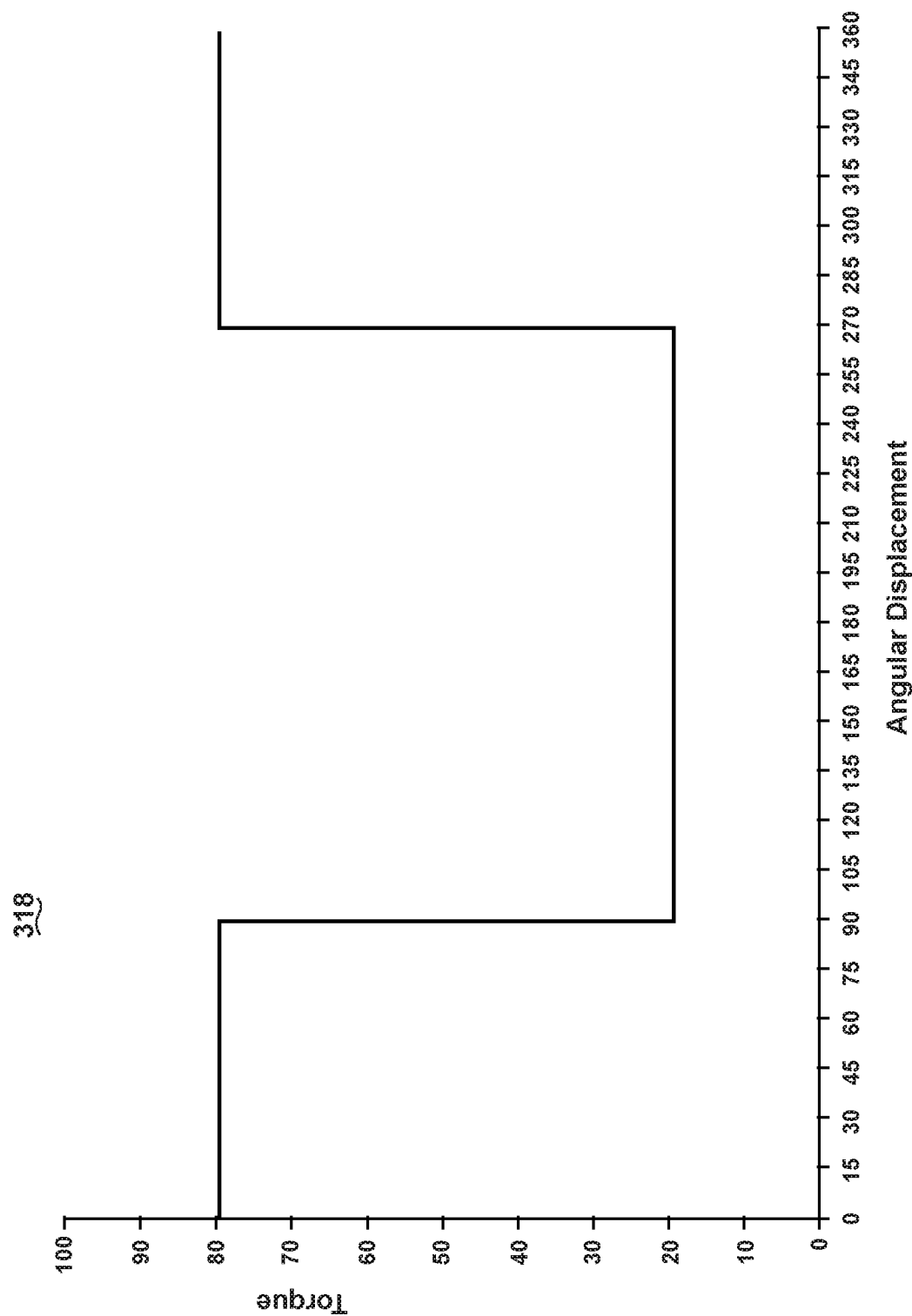
Figure 12:
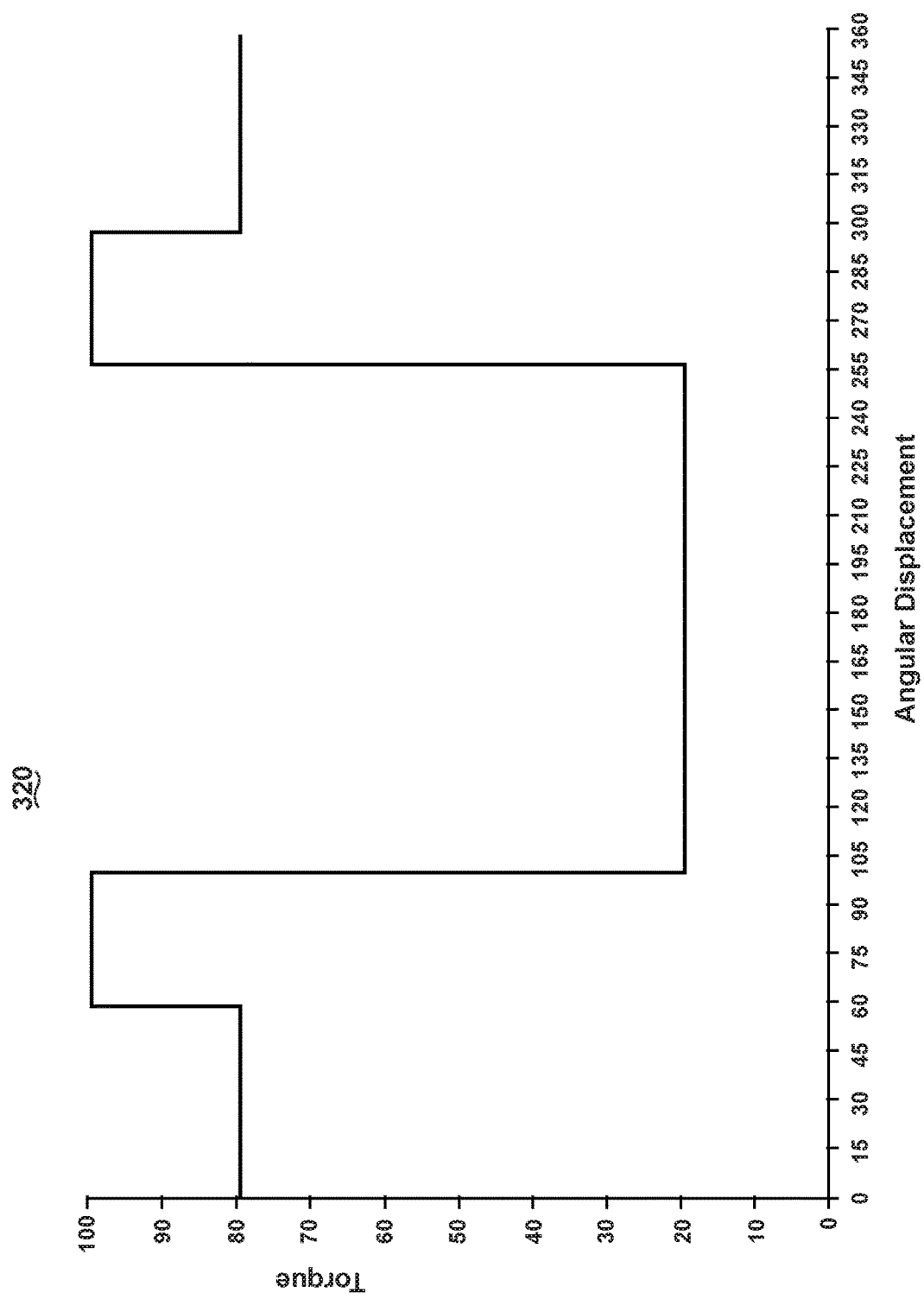
Figure 13:
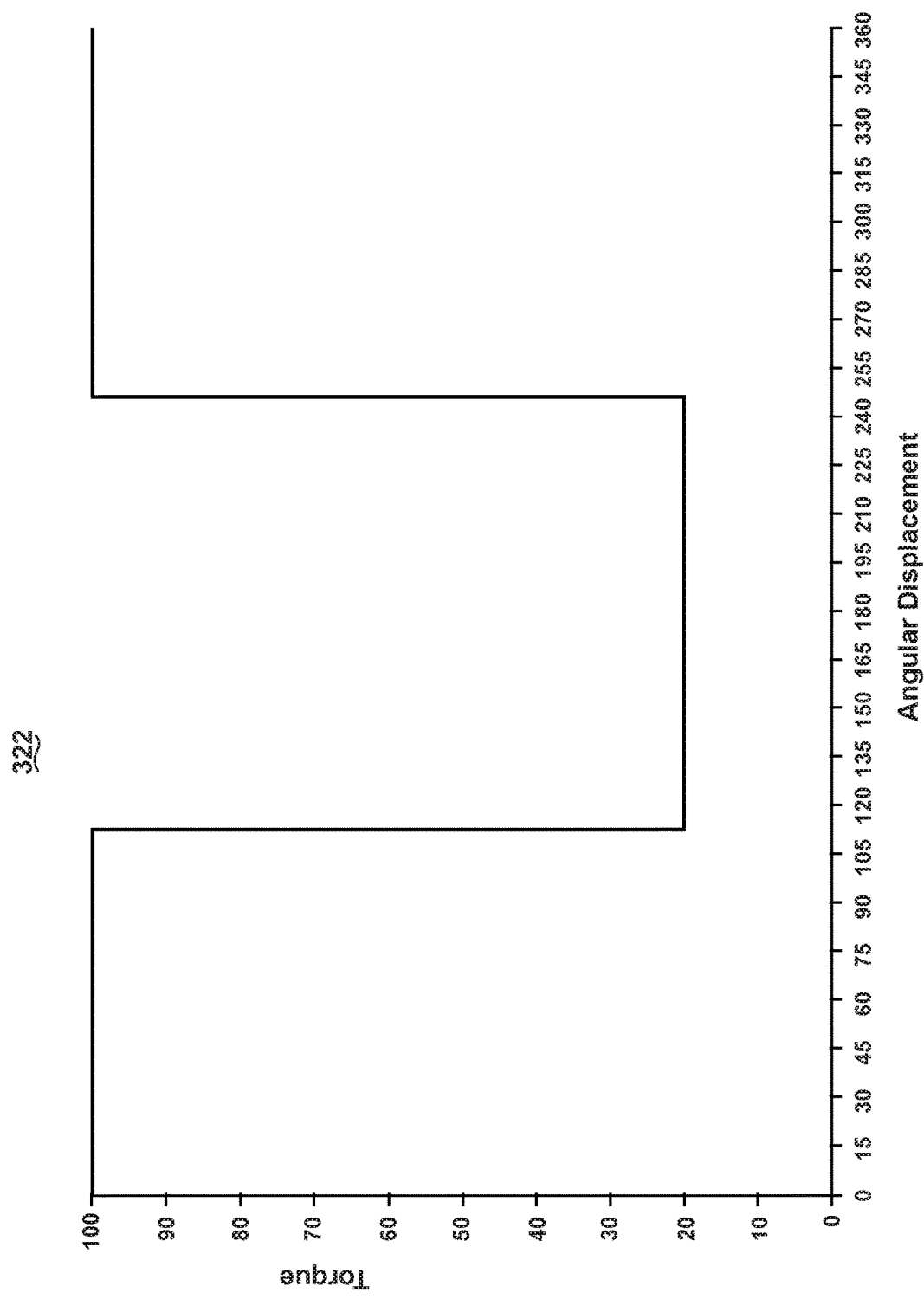
Figure 14:
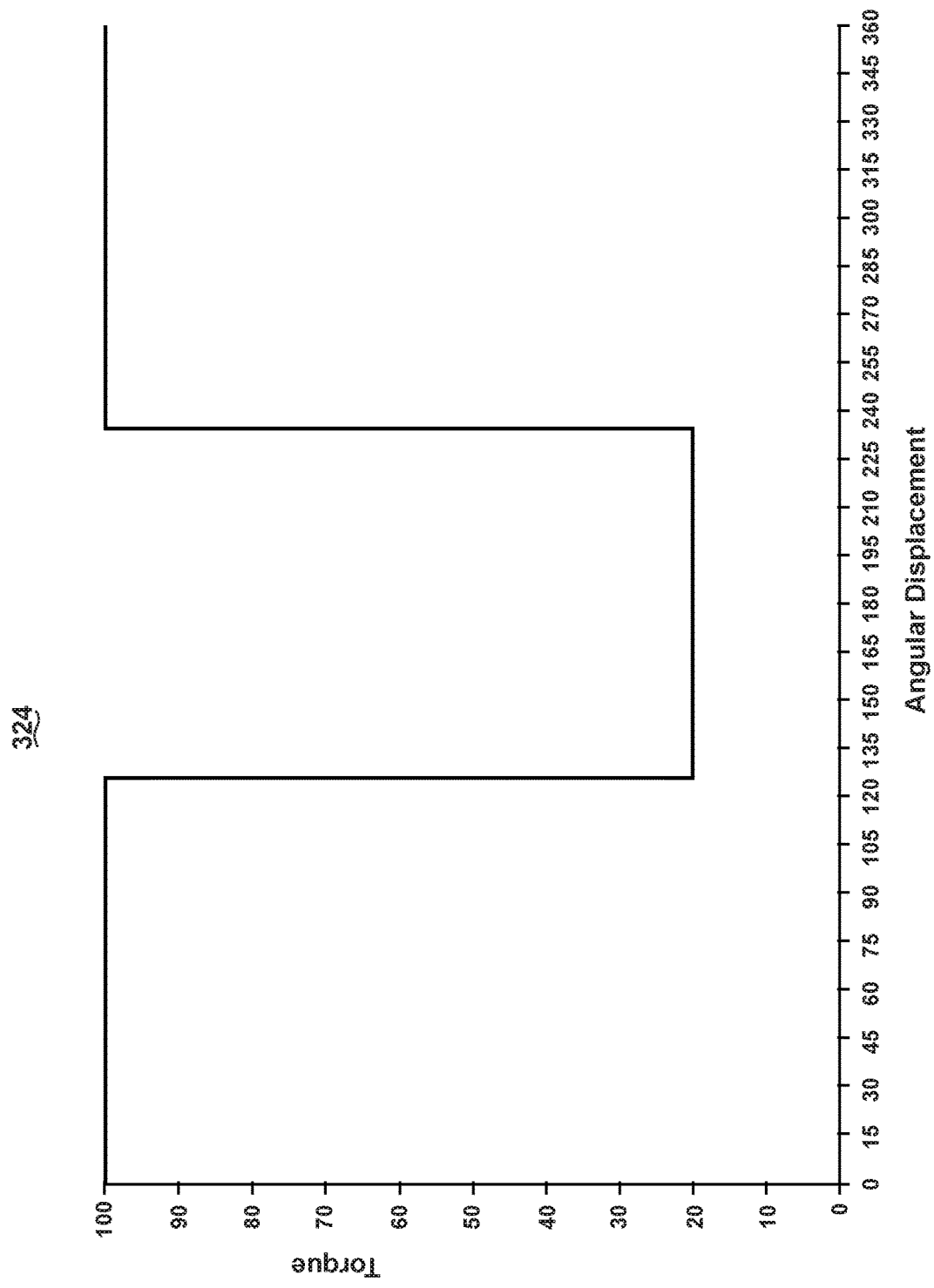
Figure 15:
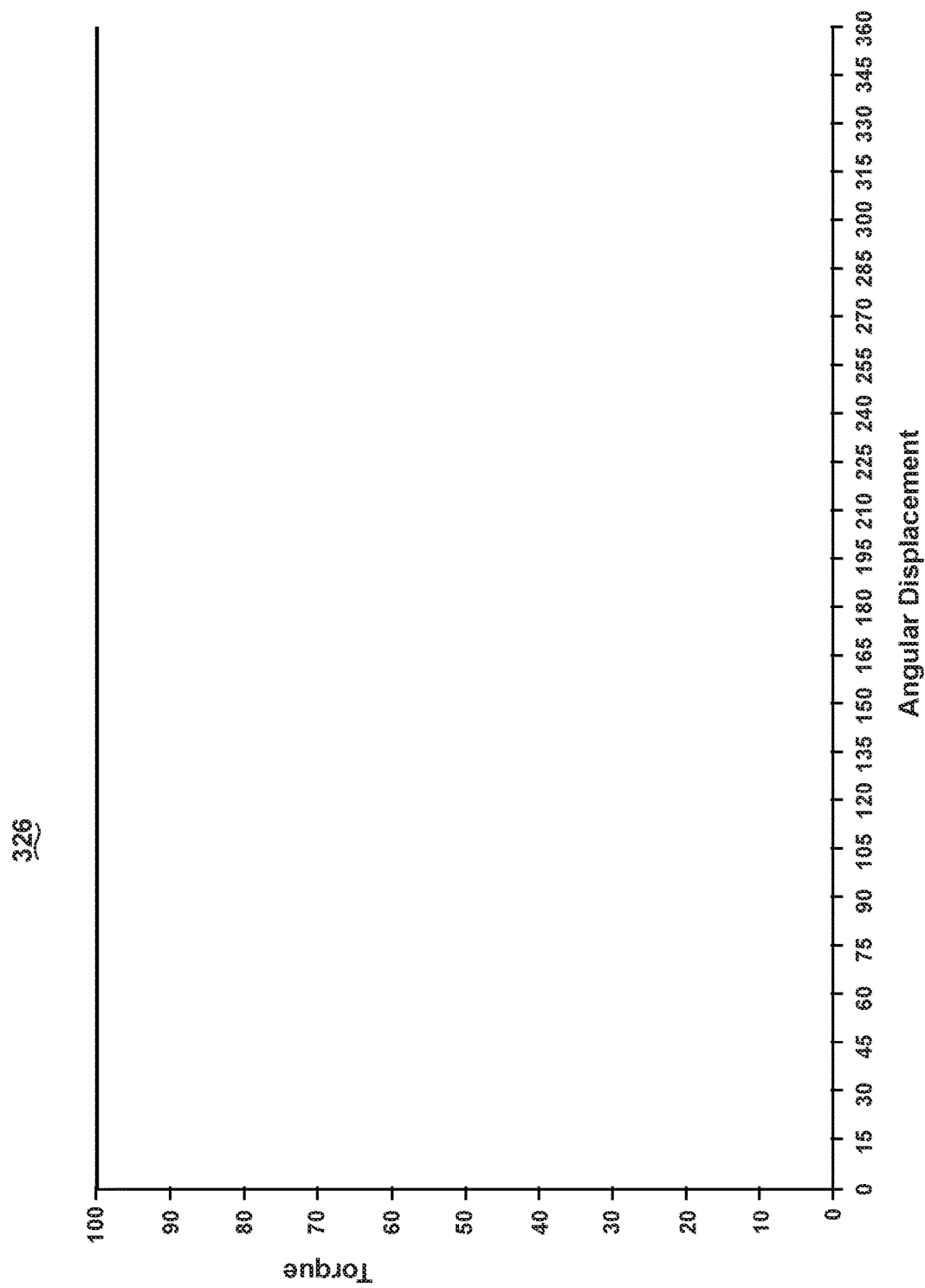

FIGS. 7-15 are graphs illustrating the motor torque signal versus mixing paddle angular displacement for the various levels of organic material in a composting bin. As shown, the torque is represented by the motor duty cycle but other signals representative of the motor torque can be used without limitation. Each of the signatures representing and resulting from the above described zones and boundaries are shown. FIG. 7 shows the signature for motor torque as represented by motor duty cycle as a function of angular displacement of the mixing blades through one revolution where there is no organic material in the composting bin (i.e. the first boundary 310). FIG. 8 shows the signature for motor torque as represented by motor duty cycle as a function of angular displacement of the mixing blades through one revolution where the height of the organic material extends into the first zone 312. FIG. 9 shows the signature for motor torque as represented by motor duty cycle as a function of angular displacement of the mixing blades through one revolution where the height of the organic material reaches the second boundary 314. FIG. 10 shows the signature for motor torque as represented by motor duty cycle as a function of angular displacement of the mixing blades through one revolution where the height of the organic material extends into the second zone 316. FIG. 11 shows the signature for motor torque as represented by motor duty cycle as a function of angular displacement of the mixing blades through one revolution where the height of the organic material reaches the third boundary 318. FIG. 12 shows the signature for motor torque as represented by motor duty cycle as a function of angular displacement of the mixing blades through one revolution where the height of the organic material extends into the third zone 320. FIG. 13 shows the signature for motor torque as represented by motor duty cycle as a function of angular displacement of the mixing blades through one revolution where the height of the organic material reaches the fourth boundary 322. FIG. 14 shows the signature for motor torque as represented by motor duty cycle as a function of angular displacement of the mixing blades through one revolution where the height of the organic material extends into the fourth zone 324. FIG. 15 shows the signature for motor torque as represented by motor duty cycle as a function of angular displacement of the mixing blades through one revolution where the height of the organic material reaches the fifth zone 326 exceeding the extent of the mixing paddles 62, 64.

The invention described herein provides a composting device where the height and consequently the volume of the organic material can be determined based on the motor torque needed to rotate the mixing paddles of the reducing mechanism. One benefit includes eliminating the need for load cells, up to eight of which are conventionally used for determining compost volume.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. A composter comprising:
   a housing;
   a controller;
   a composter bin defining a chamber configured to receive organic material;
   a reducing mechanism comprising a rotatable shaft defining a horizontal direction with a first and second paddle extending radially from the rotatable shaft where the first paddle is longer than the second paddle; and
   a motor providing a necessary torque to the reducing mechanism for rotating through the organic material;
   wherein the controller is configured to determine an amount of the organic material in the composting bin based on the necessary torque provided and the first and second paddles rotate about the rotatable shaft.

2. The composter of claim 1 where the amount determined is a height and the height is converted to a volume with the controller.

3. The composter of claim 1 where the first and second paddles have different lengths.

4. The composter of claim 3 where the length of the first paddle or the second paddle corresponds to a zone representing a height of organic material through which the first or second paddle rotates.

5. The composter of claim 4 including different height zones representing varying heights of organic material.

6. The composter of claim 5 where each height zone further represents a volume of organic material.

7. The composter of claim 1 where the first paddle and the second paddle have different shapes.

8. The composter of claim 1 where at least one of the first paddle or second paddle is horizontally extended and angled in a vertical direction.

9. The composter of claim 7 where at least one of the first paddle or second paddle is in a curved shape.

10. The composter of claim 1 where the motor operates the first paddle at different speeds during a cycle of operation.

11. A composter comprising:
    a composter bin having a chamber defining an upright cylinder defining a vertical direction with a hemispherical lower portion and configured to receive organic material;
    a reducing mechanism comprising a rotatable shaft defining a horizontal direction with a first paddle extending radially the rotatable shaft and terminating in a curved end to match a contour of the hemispherical lower portion;
    a motor providing a necessary torque to the reducing mechanism for rotating through the organic material; and
    a controller configured to determine an amount of the organic material in the composting bin based on the necessary torque provided;
    wherein the first paddle rotates about the rotatable shaft.

12. The composter of claim 11 wherein the amount determined is a height and the height is converted to a volume with the controller.

13. The composter of claim 11 wherein the reducing mechanism further includes a second paddle and the first and second paddles have different lengths.

14. The composter of claim 13 wherein the length of the first paddle or the second paddle corresponds to a zone representing a height of organic material through which the first or second paddle rotates.

15. The composter of claim 14 wherein the zone is multiple zones representing varying heights of organic material.

16. The composter of claim 11 wherein each zone further represents a volume of organic material.

17. The composter of claim 16 wherein at least one of the first paddle or second paddle is horizontally extended and angled in a vertical direction.

18. The composter of claim 11 wherein the reducing mechanism further includes a second paddle with a different dimension and shape than the first paddle.

19. The composter of claim 18 wherein the second paddle is in a curved shape.

20. The composter of claim 11 where the motor operates the first paddle at different speeds during a cycle of operation.

* * * * *